United States Patent [19]

Sumida et al.

[11] Patent Number: 4,790,791
[45] Date of Patent: Dec. 13, 1988

[54] RING-SHAPED COUPLING

[75] Inventors: Susumu Sumida, Kusatsu; Atsuo Kamata, Tondabayashi; Fuyuki Yoshii, Kobe, all of Japan

[73] Assignee: Daihatsu Diesel Mfg. Co., Ltd., Osaka, Japan

[21] Appl. No.: 64,009

[22] Filed: Jun. 19, 1987

[30] Foreign Application Priority Data

Jun. 20, 1986 [JP] Japan .................. 61-94883[U]

[51] Int. Cl.⁴ ............................................. F16D 3/76
[52] U.S. Cl. ......................................... 464/17; 464/89
[58] Field of Search .................... 464/17, 89, 90, 91

[56] References Cited

U.S. PATENT DOCUMENTS

| 1,694,926 | 12/1928 | Peters | 464/89 |
| 2,731,813 | 1/1956 | Sampson | 464/89 |
| 3,719,060 | 3/1973 | Fessel et al. | 464/89 |
| 3,727,431 | 4/1973 | Yokel | 464/89 X |
| 3,791,497 | 2/1974 | Fleischmann et al. | 464/90 X |
| 3,885,657 | 5/1975 | Sato | |
| 3,952,546 | 4/1976 | Nakano et al. | 464/90 |
| 4,322,062 | 3/1982 | Aleck | 464/89 X |

FOREIGN PATENT DOCUMENTS

| 1021213 | 12/1957 | Fed. Rep. of Germany | 464/89 |
| 2232958 | 7/1972 | Fed. Rep. of Germany | . |
| 2329936 | 6/1973 | Fed. Rep. of Germany | . |
| 982035 | 6/1951 | France | . |
| 74821 | 1/1961 | France | . |
| 1372228 | 8/1964 | France | 464/90 |
| 864388 | 4/1961 | United Kingdom | 464/89 |

Primary Examiner—Daniel P. Stodola
Attorney, Agent, or Firm—Birch, Stewart, Kolasch & Birch

[57] ABSTRACT

A ring-shaped coupling comprising an inner ring, a rubber ring whose outer circumferential surface is divided by a circular groove into two conical surfaces each flaring toward the center in the axial directions and whose inner circumferential surface forming one solid surface is made to adhere by vulcanization to the outer circumferential surface of the inner ring, a pair of outer rings which are placed facing each other in the axial direction and a joining number. One of the inner circumferential surfaces of the outer rings having the shape of a conical surface flaring toward the other, and to the inner circumferential surfaces adhering by vulcanization the two conical sections of the outer circumferential surface of the rubber ring. The joining member puts the outer rings close to each other in the axial direction and fixes them in place in such a manner as to compress the rubber ring under the outer rings.

4 Claims, 3 Drawing Sheets

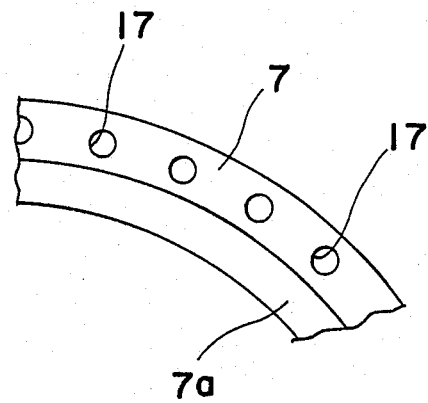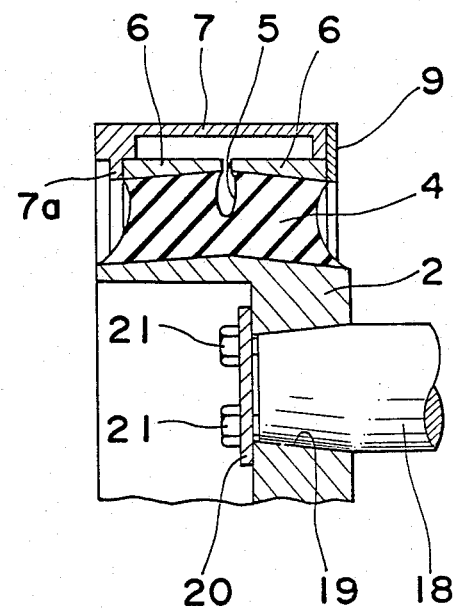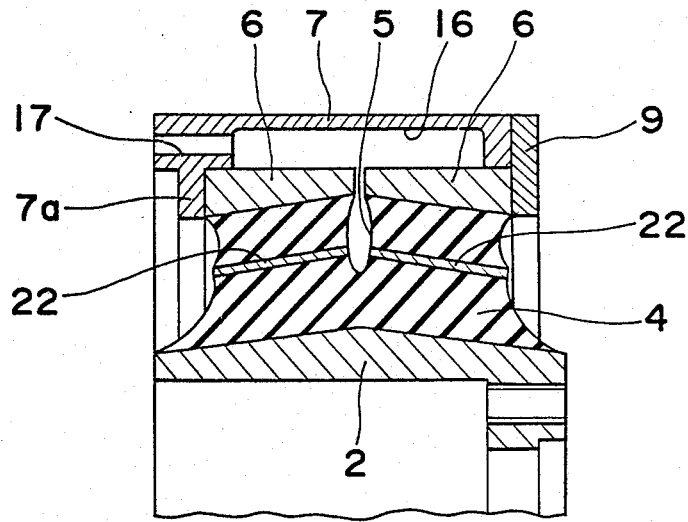

RING-SHAPED COUPLING

BACKGROUND OF THE INVENTION

The present invention relates to a ring-shaped coupling which is designed to suppress problematic torsional vibration occurring in a drive shaft for example, when joining the forward end of the drive shaft of a marine engine or land engine with the rear end of the drive shaft of the accessory machinery by means of said coupling, or to serve other like purposes.

For example, as shown in FIG. 6, a diesel engine 31 mounted on a ship has the rear end 32 of its drive shaft connected to a reduction gear 34 by means of a flexible coupling 33 and thence to a propeller 35, whereas the forward end 36 of the drive shaft is connected to a speed-increasing gear 38 by means of an air clutch 37 including a ring-shaped coupling and thence to accessory machinery such as a hydraulic pump 39 for winches, etc. and a generator 40.

FIG. 7 schematically illustrates one such ring-shaped coupling which has been in conventional use as a means to suppress torsional vibration of the forward end 36 of the drive shaft as it transmits motive power. This ring-shaped coupling consists of a sleeve 41 which is fitted on the forward end of the drive shaft (not shown in drawings) and fixed in place, a pair of inner rings 43, 43 which are fitted on said sleeve 41 and fixed together in a single body with a bolt 42, a pair of rubber rings 44, 44 whose circumferential inner surfaces are made to adhere by vulcanization to said inner rings 43, 43, a pair of outer rings 45, 45 whose circumferential inner surfaces 45a, 45a, each forming a section of a cone, adhere by vulcanization to the outer circumferential surfaces of said rubber rings 44, 44, a joining ring 47 which is fitted on said outer rings 45, 45 and clamps them together in the axial direction with a bolt 46, a flanged ring 49 which is fitted on the driven shaft (not shown in drawings) and clamped together with said joining ring 47 by a flange 47a and a bolt 48 and fixed in place. The outer circumferential surface of one of said pair of inner rings 43, 43 forms a section of a cone 43a which flares toward the other, whereas the inner circumferential surface of one of said pair of outer rings 45, 45 forms a section of a cone 45a flaring toward the other, and said pair of rubber rings 44, 44 connected by vulcanization to the respective inner and outer rings at said circumferential surfaces are pressed tight against each other in the axial directions by means of said outer rings 45, 45 and said clamping bolt 46, so that torsional vibration of the drive shaft is suppressed by means of the rubber rings 44, 44 and a large torque can be transmitted from the driving shaft to the driven shaft without damage.

The use of the conventional ring-shaped coupling as described above, however, raises various defects and problems because said inner rings 43 and rubber rings 44 consisting each of a pair as follows. To fix the pair of inner rings 43, 43 to the sleeve 41, a flange 41a is extended from the sleeve 41 so that a bolt bore 50 is threaded open through the flange 41a and the inner rings 43, 43 in the axial direction and a clamping bolt 42 is used. In practice this structure raises defects that the moment of inertia on the driving side becomes large so that, while the torsional vibration on the engine side is caused, the manufacturing cost is increased by troublesome machining and increased parts, and the coupling made requires a relatively large space contradictorily to the pursuit of compactness. Also the structure having a pair of inner rings 43, 43 which are clamped with a bolt 42 makes the mechanical strength lower than one solid structure. The rubber rings 44 connected by vulcanization to the inner rings 43 rise apart from the substrates at four edges 44a, which are liable to become the starting points for the breakage of the rubber rings. Furthermore, another problem arises from the vulcanization of the rubber rings, wherein the vulcanization by which a rubber ring 44 is made to adhere to an inner ring 43 starts at the portion of the rubber which is in contact with a heated inner ring 43 and, as the reaction progresses, portions of the rubber not yet cured run into the portions which have been cured by vulcanization reaction, thus relaxing the internal stress in the cured portion, as the vulcanization spreads toward the peripheral area. In this process, when the rubber rings 44, 44 are completely separated in a pair as shown in the drawing, portions of the rubber rings 44, 44 not yet cured can not run mutually into the cured portions, and, as a result, the internal stresses fail to balance in the vulcanized rubber rings, thus raising a problem concerning the efficiency of a coupling.

SUMMARY OF THE INVENTION

The object of the present invention is to provide a ring-shaped coupling which is structurally simplified so as to reduce the moment of inertia as well as the number of parts, the cost of manufacture and the requirement of space for the installation and whose rubber ring is free from imbalance in internal stress and has minimized chances of breakage starting where it adheres to inner and outer rings.

In order to accomplish the object, the ring-shaped coupling in accordance with the present invention comprises an inner ring, a rubber ring whose outer circumferential surface is divided by a circular groove into two conical surfaces each flaring toward the center in the axial direction and whose inner circumferential surface forming one solid surface is made to adhere by vulcanization to the outer circumferential surface of the inner ring, a pair of outer rings which are placed facing each other in the axial direction, one of the inner circumferential surfaces of the outer rings having the shape of a conical surface flaring toward the other, and to said inner circumferential surfaces adhering by vulcanization the two conical surfaces of the outer circumferential surface of the rubber ring, and a joining means which puts said outer rings close to each other in the axial direction and fixes them in place in such a manner as to compress said rubber ring under said outer rings.

The vulcanization reaction to make the rubber ring adhere to the inner ring and the outer rings starts where they are put in contact, i.e., the one solid surface of the inner circumference of the rubber ring to the inner ring which is being maintained as high temperatures and the two circular sections of the outer circumferential surface of the rubber ring correspondingly to the respective outer rings. Portions of the rubber not yet cured go freely into the portions cured by vulcanization through paths inside the bottom of the circular groove and across the inside of the rubber ring, thus completely relaxing the internal stress in the cured portions as the vulcanization progresses. The vulcanization spreads radius-wise both outwardly and inwardly. The rubber ring thus vulcanized has no imbalance in internal stress, and therefore, there occur no related troubles in efficiency of the coupling produced. Since, furthermore, the inner ring is made in one piece, a coupling produced is structurally simplified, using no bolt for the mutual joining of the inner ring, the side of the inner ring fixed directly to the end of the drive shaft, reduced requirement of machinery parts, and reduced amount of inertia, and, with the edges of the rubber ring on the inner ring, to which it adheres, reduced to two in number, the coupling has the chances of breakage at the adhering portions reduced by a half.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The object and features of the present invention will become apparent from the following description taken in conjunction with the preferred embodiments thereof with reference to the accompanying drawings which are given by way of illustration only, and thus are not limitative of the present invention, and in which:

FIG. 3 is a partial side view of the coupling in FIG. 1 as seen from the direction of the arrow III;

FIG. 4 is a cross-sectional cutaway view of a small-type ring-shaped coupling as another embodiment of the present invention;

FIG. 5 is a cross-sectional cutaway view of a variant example embodying the present invention;

DETAILED DESCRIPTION OF THE PREFERRED EMBODIMENTS

Figure 1:
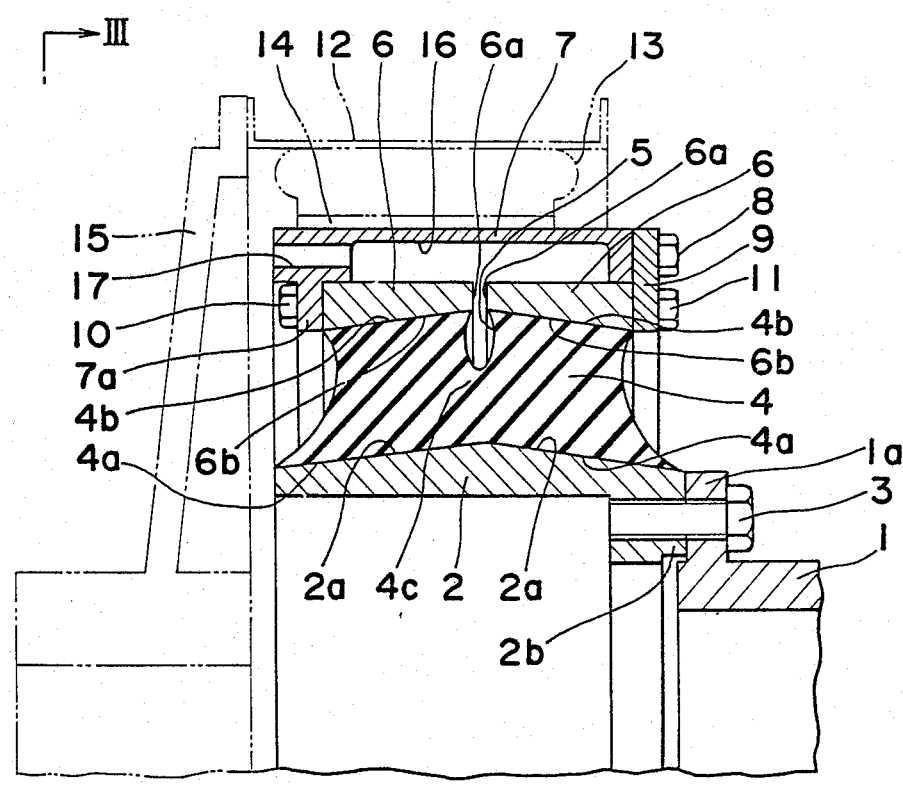
FIG. 1 shows a cross-sectional cutaway view of a ring-shaped coupling as an embodiment of the present invention.

Before the description of the present invention proceeds, it is to be noted that like parts are designated by like reference numerals throughout the accompanying drawings.

FIG. 1 illustrates a cutaway cross-section of a ring-shaped coupling as an embodiment of the invention. In FIG. 1 a flange 1a extends from the end of a drive shaft 1 and and inner ring 2 with the same axis as the drive shaft 1 is fixed to the flange 1a with a bolt 3. The solid structure inner circumferential surface 4a of a rubber ring 4 adheres by vulcanization to the outer circumferential surface of the inner ring 2. The outer circumferential surface of the rubber ring 4 is divided by a circular groove 5 into two conical surfaces 4b, 4b, which adhere by vulcanization to the inner circumferential surfaces of a pair of outer rings 6, 6. The outer rings 6, 6 are placed on the same axis and facing each other at their respective edges 6a, 6a, toward which the inner circumferential surfaces 6b, 6b flare each in the shape of a conical surface. A joining ring 7 is fitted over the pair of outer rings 6, 6 and has one edge extending inward forming a flange 7a and the other edge fixed to a ring flange 9 with a bolt 8 so that the outer rings 6, 6 are held close to each other in the axial direction and fixed in place with bolts 10, 11.

An air clutch rim 12 is fitted over the joining ring 7 with a space between the two and held freely rotatable. A tube 13 which expands or shrinks as air is let in or let out is attached to the inner circumferential surface of the air clutch rim 12. An air clutch shoe 14 is fixed to the inner circumferential surface of the tube 13 and is designed to be put on and off the outer circumferential surface of the joining ring 7, and a flange 15 is fixed to the air clutch rim 12 with bolts (not shown in drawings) and coaxially connected with the driven shaft (not shown in drawings).

Figure 2:
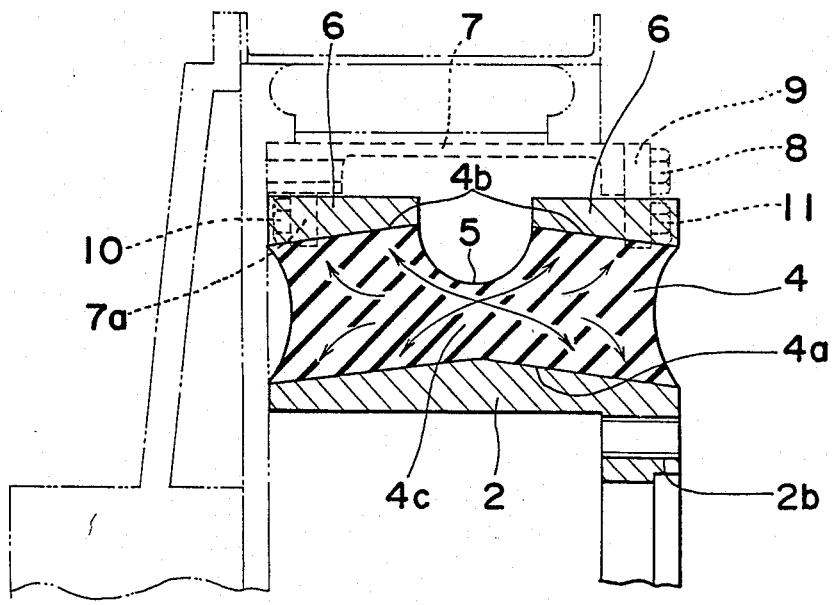
FIG. 2 illustrates the cross-sectional view of the ring-shaped coupling before the outer rings are clamped in place on a joining member.
Figure 6:
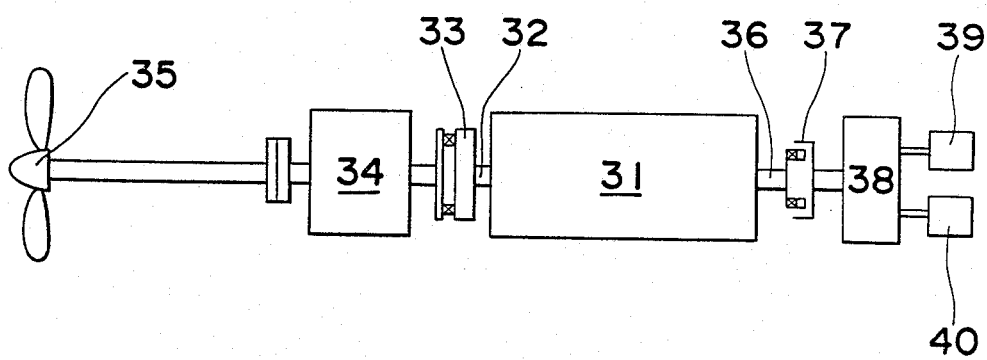
FIG. 6 schematically shows an elevational side view of a diesel engine using a ring-shaped coupling.
Figure 7:
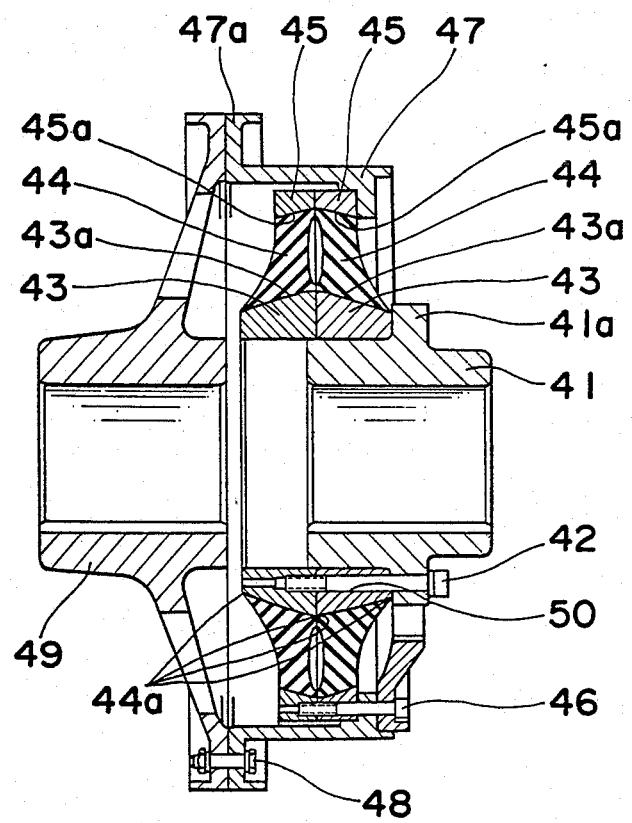
FIG. 7 is a cross-sectional view of a conventional ring-shaped coupling.

The inner surfaces 6b, 6b of the pair of outer rings 6, 6 form conical surfaces in symmetry in the axial direction, and likewise, the outer surface of the inner ring 2 forms conical surfaces 2a, 2a each flaring toward the middle in the axial direction in symmetry. Placed between these outer and inner rings, the circular groove 5 in the outer circumferential surface of the rubber ring 4 assumes the shape of a semicircular opening, as shown in FIG. 2, before the joining ring 7 is mounted in place. In the drawing, one edge of one outer ring 6 is fixed to the flange 7a extending from the joining ring 7 with a bolt 10 and one edge of the other outer ring 6 is fixed to the ring flange 9 with a bolt 11, and the ring flange 9 is fixed to the joining ring 7 with a bolt 8 in such a manner as to hold the rubber ring 4 compressed in the axial direction by the outer rings 6, 6. When the fastening is thus complete, the circular groove 5 assumes the shape of a deep elliptic groove, as shown in FIG. 1. The rubber ring 4 also becomes precompressed by approximately five percent and thus gains in tensile strength so that it becomes capable of transmitting a big torque from the inner ring 2 to the outer rings 6 without breakage. There is provided an air chamber 16 in the shape of a circular groove along the inner surface of the joining ring 7 as a means to prevent the transmission to the rubber ring 4 of the heat caused by the friction between the joining ring 7 and the air clutch shoe 14. As shown in FIG. 3, the joining ring 7 has many air vents 17 opened in its side to discharge the hot air from the air chamber 16.

The advantages of a ring-shaped coupling embodying the invention as in the foregoing description are significant of an improvement at the stage of production. For the vulcanization to make the rubber ring 4 adhere to the inner ring 2 and the outer rings 6, 6, the solid structure inner circumferential surface 4a of the rubber ring 4 is put in contact with the inner ring 2 which is being maintained at high temperatures for the vulcanization and the two conical surfaces 4b, 4b formed on the outer surface of the rubber ring with a circular groove 5 therebetween are put in contact with the outer rings 6, 6 which are being maintained at high temperatures, so that the vulcanization reaction starts at the portions of the rubber ring which are respectively in contact with the inner ring 2 and the outer rings 6, 6. As the vulcanization progresses, portions of the rubber not yet cured run into the curred portions of the rubber through the bottom interior 4c below the circular groove 5 freely without any obstruction (see the arrows in FIG. 2) and in such a manner as to sufficiently relax the internal stress at the cured portions of the rubber. The vulcanization reaction takes place inwardly from the circumferential surfaces in the rubber ring until it ends. The vulcanization thus given does not cause the rubber ring 4 to have an imbalance in internal stress after the vulcanization, and therefore, there occur no troubles in efficiency of the coupling produced. Since the edges of the rubber ring 4 on the inner ring 2, to which it adheres, are reduced to two instead of four in number, the rubber ring 4 has the chances of its breakage at these adhering parts reduced by half. And, furthermore, since the inner ring 2 consists of one single body, not divided into sections, the coupling shows and improvement in mechanical strength, and with a bolt 3 fixing the side 2b of the inner ring 2 directly to a flange 1 at the end of the drive shaft, without requirement of bolts for the mutual connection of a conventional double inner ring, the coupling produced has advantages in reduced moment of inertia, simplified structure, reduced requirement of machinery parts, reduced space required and reduced manufacturing cost.

FIG. 4 shows a cutaway cross-section of a small type ring-shaped coupling as a variant embodiment of the present invention. In this example, a tapering end of a drive shaft 18 is fitted into a tapering hole 19 bored in the middle of the side of an inner ring 2, and the drive shaft 18 and the inner ring 2 are fixed to each other with a fastening plate 20 and bolts 21, 21.

FIG. 5 shows a cutaway cross-section of a ring-shaped coupling as another variant embodiment of the invention, wherein the rubber ring 4 has a pair of ring-shaped intermediate plates 22 which are embedded at positions halfway across the rubber ring 4 in the direction of radius and across the rubber ring substantially in the axial direction. When the coupling is manufactured, these intermediate adhesive plates 22 are used to accelerate the vulcanization reaction of the rubber ring by heating so that a good efficiency can be imparted to the product, while, when used, the plates serve to suppress the vibration which is caused by the outer rings 6 or joining rings 7 when the air-clutch is off. An ordinary elastomer, without restricting to rubber, can be employed for the rubber ring in this particular embodiment. Whereas the drive shaft is connected with the inner ring 2 and the driven shaft with the joining ring 7 in the above example, this mode of connection can be switched to a mode connecting the drive shaft with the joining ring and the driven shaft with the inner ring. A ring-shaped coupling in this description can be used in the drive shaft at the rear of the main engine, and can be connected directly to the driven shaft in a system not using an air clutch.

As will have become clear from the foregoing description, according to the present invention, when the vulcanization reaction to make the rubber ring adhere to the inner ring and the outer rings takes place, the rubber ring being one solid body, portions of the rubber not yet cured run freely into the cured rubber in such a manner as to relax the internal stress in the cured portions and thus not to cause an imbalance in the internal stress. The improvement in efficiency of the rubber ring is therefore ensured. Since the edges of the rubber ring on the inner ring, to which it adheres, are reduced to a half in number, the chances of breakage of the rubber ring at these edges are accordingly reduced. Furthermore, as the coupling of the present invention includes the circular air chamber leading to the outside, heat caused by the friction between the joining means and an external device such as an air clutch is prevented from being transmitted to the rubber ring. In addition to this, the rubber ring has a circular gap, when pre-compressed, which leads to the circular air chamber through the clearance of the outer rings. Furthermore, one solid structure body constitutes the inner ring in this invention, and therefore, a coupling produced shows good mechanical strength with no requirement of a bolt for the mutual connection of a double ring, reduced moment of inertia, and simplified structure lowering the production cost.

Although the present invention has been described in connection with preferred embodiments thereof, many variations and modifications will now become apparent to those skilled in the art. It is preferred, therefore, that the present invention is limited not by the specific disclosure herein, but only by the appended claims.

What is claimed is:

1. A ring-shaped coupling comprising:
   an inner ring;
   a pair of outer rings which are placed facing each other in the axial direction and with a specified clearance therebetween, each having an inner circumferential surface consisting of a conical surface flaring toward the other;
   a rubber ring disposed between the inner ring and the pair of outer rings, said rubber ring having an inner circumferential surface which forms a single, solid surface and which adheres by vulcanization to an outer circumferential surface of the inner ring while an outer surface thereof is divided into two conical surfaces, which adhere by vulcanization to the respective conical inner circumferential surfaces of the outer rings, by a circular groove provided axially in the middle of and in the circumferential direction of the rubber ring, wherein the circular groove forms a circular gap leading to the clearance of the outer rings when the outer rings are fixed in place together with the rubber ring; and
   joining means having a cylindrical outer surface for putting said pair of outer rings close to each other in the axial direction and fixing them in place while compressing said rubber ring, and forming a circular air chamber leading outside between the inner surface thereof and the pair of outer rings, said circular groove communicating with said circular air chamber.

2. The ring-shaped coupling as claimed in claim 1, wherein the outer circumferential surface of the inner ring consists of two conical surfaces each flaring toward the center in the axial direction and the inner circumferential surface of the rubber ring consists of two conical surfaces each flaring toward the center in the axial direction so as to fit on the outer circumferential surface of the inner ring.

3. The ring-shaped coupling as claimed in claim 1, wherein the joining means is provided with a circular groove along its inner circumferential surface and this circular groove forms the circular air chamber.

4. The ring-shaped coupling as claimed in claim 1, wherein the joining means is provided with a plurality of vents on at least one side thereof for discharging hot air therefrom to the outside.

* * * * *